United States Patent [19]
Christ

[11] Patent Number: 5,834,706
[45] Date of Patent: Nov. 10, 1998

[54] METHOD AND APPARATUS FOR VERIFYING THE CONTENTS OF PACKAGES DELIVERED TO OR LEAVING A WAREHOUSE

[76] Inventor: Ferdinand Christ, Johann-Sebastian-Bach-Ring 21 D-91575, Windsbach, Germany

[21] Appl. No.: 522,151

[22] Filed: Aug. 31, 1995

Related U.S. Application Data

[63] Continuation-in-part of Ser. No. 71,872, Jun. 4, 1993, abandoned.

[30] Foreign Application Priority Data

Jun. 4, 1992 [DE] Germany ............ 42 18 429.0

[51] Int. Cl.⁶ ............ G01G 9/00; G01G 19/40; B07C 5/00; B65G 69/00
[52] U.S. Cl. ............ 177/1; 177/25.15; 177/145; 414/21; 414/222; 414/273; 414/786; 209/576; 209/645
[58] Field of Search ............ 177/25.15, 145, 177/1; 364/567, 478; 414/21, 222, 273, 786; 209/583, 587, 656, 592, 576, 588, 589, 645

[56] References Cited

U.S. PATENT DOCUMENTS

| | | | |
|---|---|---|---|
| 4,832,204 | 5/1989 | Handy et al. | 209/3.3 |
| 5,220,536 | 6/1993 | Stringer et al. | 364/565 |
| 5,233,532 | 8/1993 | Ramsden | 364/464.03 |
| 5,493,517 | 2/1996 | Frazier | 364/564 |

FOREIGN PATENT DOCUMENTS

| | | |
|---|---|---|
| 2 565 370 | 12/1985 | France . |
| 33 03 109 | 8/1984 | Germany . |
| 38 09 363 | 9/1989 | Germany . |

*Primary Examiner*—Randy W. Gibson
*Attorney, Agent, or Firm*—Spencer & Frank

[57] ABSTRACT

Apparatus and method for handling of packages containing goods in a warehouse and for verifying contents of the packages includes conveying the packages through consecutive stations; performing a plausibility check on the packages by generating and outputting signals which are indicative of respective plausibility parameters, and inputting the electrical signals to the computer for effecting a plausibility determination, the plausibility check being composed of weighing the packages and outputting a signal indicative of weight; measuring volume of the packages and outputting a signal indicative of volume; and measuring at least one property of the goods contained in the packages and outputting a signal indicative of the at least one property; and inputting electrical signals outputted from the identifying and performing steps to the computer; comparing the respective signals inputted to the computer with respective predetermined data stored in the computer and generating a plausibility determination including a contents verification determination as respective output signals as a function of the comparisons for effecting destination control of the packages and for effecting verification of the contents of the packages; and conveying packages whose contents are verified as correct to one of a storage location or to an exit of the warehouse for delivery to a customer, and conveying packages whose contents are not verified as correct to an error inspection location. Preferably the method is fully automated and includes identifying the packages with an information reader and outputting a signal to the computer.

13 Claims, 3 Drawing Sheets

METHOD AND APPARATUS FOR VERIFYING THE CONTENTS OF PACKAGES DELIVERED TO OR LEAVING A WAREHOUSE

CROSS REFERENCE TO RELATED APPLICATION

This is a continuation-in-part of U.S. patent application Ser. No. 08/071,872 filed Jun. 4, 1993, which claims the priority of Application No. P 42 18 429.0 filed Jun. 4th, 1992 in the Federal Republic of Germany, the subject matter of which is incorporated herein by reference.

BACKGROUND OF THE INVENTION

1. Field of the Invention

The present invention relates to a method and an apparatus for identifying, labelling and controlling the destination of incoming and outgoing packages containing goods in a warehouse. More particularly, the invention relates to a method and apparatus for verifying the contents of packages containing goods as they are delivered to or leave a warehouse in order to detect errors including errors in quantity and quality of the goods.

2. Description of the Related Art

Upon the arrival at a warehouse, packages containing goods must be identified, labelled, and their destination within the warehouse must be determined. As used herein, "goods" refers to one or a plurality of articles contained in a package. This means that the content of the incoming packages must be known, particularly the quantity, type, and manufacturer or supplier of the goods, and information must accompany the packaged goods, which are usually in a container, such as a box or the like, as to where in the warehouse the packages are to be conveyed. This process has been called labelling and destination control.

In the prior art, this has been done largely by hand. As a result, packages conveyed on a conveyor belt were repeatedly removed from and placed back on the conveyor belt, and the entire labelling and destination control process was performed by hand at a great expenditure of time and personnel.

More automated methods of handling packages are known, see, for example, U.S. Pat. Nos. 5,171,120, 5,222,855, 5,246,332, and 5,273,392 to Bernard II et al.; U.S. Pat. No. 4,586,613 to Horii; U.S. Pat. No. 4,543,766 to Boshinski; and U.S. Pat. No. 5,109,936 to Ruppel, the disclosures of which are incorporated herein by reference. Ruppel, for example, teaches reweighing goods in transit as a plausibility check in order to insure the accuracy of an original weight reading. Other methods check the volume and/or the weight of the packages in order to detect errors in packaging and to detect theft or deception.

These known methods, however, still do not function satisfactorily. For example, it is possible that a package delivered with deceptive intent or a package tampered with during shipping or storage matches the designated contents data with respect to volume and weight, but contains fewer articles or lower quality articles instead of the designated goods.

This may take the form of shorting and employing fillers. For example, a package containing a plurality of mens' shirts may have a package volume and weight which correspond exactly to the correct, i.e., as designated, package volume and weight, yet contain only half the number of shirts designated on the package's contents label. The missing half has been replaced by worthless fillers, such as cardboard, styrofoam or the like, to bring the volume and weight up to the designated values for the package.

Alternatively, this may take the form of altering components by substituting lower quality or lower cost components. For example, a package containing a video recorder may have been supplier manipulated to include lower quality components, for example, components made of plastic instead of metal, such as iron.

It is thus an object of the present invention to provide a method and apparatus for plausibility checking and controlling the destination of incoming and outgoing packages containing goods in a warehouse which is preferably performed automatically, that is, largely without human help.

It is yet another object of the present invention to provide a method and apparatus for verifying the contents of packages delivered to or leaving a warehouse that is perceptibly more effective in detecting errors including errors in quantity and quality of the goods whether innocent or deceptive in origin.

SUMMARY OF THE INVENTION

These objects are accomplished by the present invention which provides a method for verifying contents of a package containing goods delivered to or leaving a warehouse, comprising: (a) conveying the package through consecutive stations; (b) performing a plausibility check on the package in at least three respective stations by generating and outputting respective electrical signals which are indicative of respective plausibility parameters, and inputting the electrical signals to an electronic data processing means for effecting a plausibility determination, the plausibility check being comprises of: (i) weighing the package in one of the at least three stations employing means for weighing and outputting an electrical signal indicative of weight; (ii) measuring volume of the package in one of the at least three stations employing means for measuring volume and outputting an electrical signal indicative of volume; and (iii) measuring at least one property of the goods contained in the package in one of the at least three stations employing means for measuring the at least one property and outputting an electrical signal indicative of the at least one property; (c) inputting electrical signals outputted from step (b) to the electronic data processing means; (d) comparing the respective signals inputted to the electronic data processing means with respective predetermined data stored in the electronic data processing means and generating a plausibility determination including a contents verification determination as respective output signals as a function of the comparisons for effecting destination control of the package and for effecting verification of the contents of the package delivered to or leaving the warehouse; and (e) conveying a package whose contents are verified as correct to one of a storage location in the warehouse or to an exit of the warehouse for delivery to a customer, and conveying a package whose contents are not verified as correct to an error inspection location in the warehouse.

The method advantageously further comprises labelling the package in one of the stations with information corresponding to the electrical signals outputted from step (b) and the respective output signals from step (d) prior to step (e).

The measuring of at least one property of the goods contained in the package is performed by employing at least one technique selected from the group consisting of electrical, mechanical, and chemical techniques. The measuring of at least one property of the goods contained in the package may be performed by employing a technique selected from the group consisting of radiation application and sensing, acoustical energy application and sensing, magnetic field application and measurement, and moisture content measurement. The at least one property of the goods which is measured is preferably a physical property. Preferably the method is fully automated and steps (b) through (e) take place in transit and during conveyance of the package.

These objects are additionally accomplished by the present invention which provides a method for automated handling of a package containing goods in a warehouse and for verifying contents of the package delivered to or leaving the warehouse, comprising: (a) conveying the package through consecutive stations; (b) identifying the package in transit in one of the stations during conveyance of the package employing means for reading information present on the package and outputting an electrical signal indicative of the information to an electronic data processing means; (c) performing a plausibility check on the package in transit in at least three respective stations during conveyance of the package by generating and outputting respective electrical signals which are indicative of respective plausibility parameters, and inputting the electrical signals to the electronic data processing means for effecting a plausibility determination, the plausibility check being comprised of: (i) weighing the package in transit in one of the at least three stations during conveyance of the package employing means for weighing and outputting an electrical signal indicative of weight; (ii) measuring volume of the package in transit in one of the at least three stations during conveyance of the package employing means for measuring volume and outputting an electrical signal indicative of volume; and (iii) measuring at least one property of the goods contained in the package in transit in one of the at least three stations during conveyance of the package employing means for measuring the at least one property and outputting an electrical signal indicative of the at least one property; (d) inputting electrical signals outputted from steps (b) and (c) to the electronic data processing means; (e) comparing the respective signals inputted to the electronic data processing means with respective predetermined data stored in the electronic data processing means including the electrical signal indicative of the identifying information and generating a plausibility determination including a contents verification determination as respective output signals as a function of the comparisons for effecting destination control of the package and for effecting verification of the contents of the package delivered to or leaving the warehouse; and (f) conveying a package whose contents are verified as correct to one of a storage location in the warehouse or to an exit of the warehouse for delivery to a customer, and conveying a package whose contents are not verified as correct to an error inspection location in the warehouse.

The method advantageously further comprises labelling the package in transit in one of the stations during conveyance of the packages with information corresponding to the electrical signals outputted from step (c) and the respective output signals from step (e) prior to step (f).

Measuring of at least one property of the goods contained in the package is performed by employing at least one technique selected from the group consisting of electrical, mechanical, and chemical techniques. The measuring of at least one property of the goods contained in the package may be performed by employing a technique selected from the group consisting of radiation application and sensing, acoustical energy application and sensing, magnetic field application and measurement, and moisture content measurement. Preferably the at least one property of the goods which is measured is a physical property.

These objects are further accomplished by the present invention which provides an apparatus for verifying contents of a package containing goods delivered to or leaving a warehouse, comprising: (a) means for conveying the package through consecutive stations; (b) an electronic data processing means; (c) means for performing a plausibility check on the package in at least three respective stations by generating and outputting respective electrical signals which are indicative of respective plausibility parameters, and inputting the respective electrical signals to the electronic data processing means for effecting a plausibility determination, the means for performing a plausibility check being comprised of: (i) means for weighing the package in one of the at least three stations and outputting an electrical signal indicative of weight; (ii) means for measuring volume of the package in one of the at least three stations and outputting an electrical signal indicative of volume; and (iii) means for measuring at least one property of the goods contained in the package in one of the at least three stations and outputting an electrical signal indicative of the at least one property; and (d) means for inputting electrical signals outputted from step (c) to the electronic data processing means; (e) means for comparing the respective signals inputted to the electronic data processing means with respective predetermined data stored in the electronic data processing means and means for generating a plurality determination including a contents verification determination as respective output signals as a function of the comparisons for effecting verification of the contents of the package delivered to or leaving the warehouse; and (f) means for conveying a package whose contents are verified as correct to one of a storage location in the warehouse or to an exit of the warehouse for delivery to a customer, and means for conveying a package whose contents are not verified as correct to an error inspection location in the warehouse.

These objects are additionally accomplished by the present invention which provides an apparatus for automated handling of a package containing goods in a warehouse and for verifying contents of the package delivered to or leaving the warehouse, comprising: (a) means for conveying the package through consecutive stations; (b) an electronic data processing means; (c) means for reading information present on the packages in transit in one of the stations during conveyance of the package and outputting an electrical signal indicative of the information to the electronic data processing means; (d) means for performing a plausibility check on the package in transit in at least three respective stations during conveyance of the package by generating and outputting respective electrical signals which are indicative of respective plausibility parameters, and inputting the respective electrical signals to the electronic data processing means for effecting a plausibility determination, the means for performing a plausibility check being comprised of: (i) means for weighing the package in transit in one of the at least three stations during conveyance of the package and outputting an electrical signal indicative of weight; (ii) means for measuring volume of the package in transit in one of the at least three stations during conveyance of the package and outputting an electrical signal indicative of volume; and (iii) means for measuring at least one property of the goods contained in the package in transit in one of the at least three stations during conveyance of the package and outputting an electrical signal indicative of the at least one property; and (e) means for inputting electrical signals outputted from steps (c) and (d) to the electronic data processing means; (e) means for comparing the respective signals inputted to the electronic data processing means with respective predetermined data stored in the electronic data processing means including the electrical signal indicative of the identifying information and means for generating a plausibility determination including a contents verification determination as respective output signals as a function of the comparisons for effecting destination control of the package and for effecting verification of the contents of the package delivered to or leaving the warehouse; and (f) means for conveying a package whose contents are verified as correct to one of a storage location in the warehouse or to an exit of the warehouse for delivery to a customer, and means for conveying a package whose contents are not verified as correct to an error inspection location in the warehouse.

To provide a method for identifying and controlling the destination of incoming and outgoing packages in a warehouse, the packages are transported through a plurality of stations at the warehouse entrance and exit, respectively, where the contents of the packages are identified and the packages are subsequently weighed and their basal surface area and height are measured. The packages are preferably subsequently labeled, preferably, by indicating their destination (based on the contents verification determination) and measured values of weight, basal surface area and height or volume. However, labeling information can be omitted if only one destination is involved to which the packages are then automatically directed.

Weighing may also constitute counting where a package contains identical articles of substantially equal weight and where the unit weight of each article is known. Then, the weight of the package may be used to count the number of articles contained in the package. It is preferable to warehouse packages containing only identical goods.

Because the described method steps are performed preferably in transit, the travel of the packages through the warehouse no longer needs to be stopped as in prior art manual handling. Thus, the execution of the preferred embodiment of the method according to the invention distinguishes itself by great speed and freedom from jamming during the transit of the packages. The entire process is performed mechanically and basically without manual interference.

In a preferred embodiment of the invention, the packages are identified in a first station positioned along the so-called control path. This is accomplished with the help of a suitable reading device as is known in the art, for example, an electronic scanner which reads identifying information, such as bar code information, provided on the respective packages by the manufacturer or supplier and produces an electrical signal indicative of the identification information which is then outputted to an electronic data processing device, such as a computer, where it is stored. This provides information relating to the respective goods, including their origin (manufacturer and country), identifying number(s) of the article(s), such as stock or catalog numbers, color of the article(s), and size of the article(s), etc.

A plausibility check is preformed which shows whether the information obtained along the control path is within plausible limits for space, floor and ceiling, available in the destination and whether the contents are verified as being contained in the packages based on a comparison with predetermined data stored in the EDP system inputted from information on the packages themselves and/or from historical information for that type of package stored in the EDP system's memory. The plausibility check includes measurement of weight, measurement of basal surface area and height or volume of the goods themselves.

The packages are then conveyed to a weighing station, where gross weight of the respective packages, i.e., goods and packaging including package and packing materials, is measured, preferably in transit, and an electrical signal indicative of the weight is generated and outputted to a central computer in the warehouse. This weight check makes it possible to verify whether packages contain the correct weight of articles and, where unit weight information is available for identical article, such as from the manufacturer's labelling, the correct number of articles may be verified as well. This concept is known from EP 0,052,232 B1 which corresponds to U.S. Pat. No. 4,417,630, the contents of which are incorporated herein by reference.

Subsequently, the packages are conveyed to a volume station where basal surface area and height of the respective packages are measured and used to provide a volume measurement. The information relating to the basal surface area of the packages is required in order to determine the basal surface area that will be required for warehouse storage areas or for transport devices (trucks, railway boxcars, and the like) to be used later, and the information relating to the height of the packages is required in order to later transport the packages into a warehouse storage area or load the packages into transportation devices of sufficient height to accommodate the packages.

The packages are then conveyed to a station where at least one property of the contents is measured. While the property may be any property of the contents, preferably it is a physical property such as transparency to X-rays or reflection of ultrasonic waves. Of course, it is also possible to first take the volume measurement and then perform the weight check. It is also possible to perform the step of measuring at least one property after or in between the volume measurement and the weight check.

The packages are optionally and advantageously subsequently labelled at a labelling station where the actual measured weight, basal surface area and height or volume, and the at least one property are printed on the respective packages either directly or onto labels which are then applied to the respective packages. For example, in addition to the gross weight, basal surface area and height or volume of the respective packages, and the at least one property measurement of the contents, information may be placed on the respective packages, such as the identification number, color, and size of the articles, and, where the unit weight of identical articles is provided by the manufacturer or supplier, the computed number of articles in the respective packages. This information, as mentioned, is important for identification of appropriate storage locations, and provides the destination control data for the storage location in the warehouse and permits verification of contents. All information obtained as electrical signals from sensors and measuring devices known in the art per se at respective stations are outputted to an electronic data processing system, such as a central computer for the warehouse, as signals indicative of parameters, such as weight, etc. Signals inputted to the central computer are processed electronically according to methods know in the art, are evaluated there, and are preferably stored so that invoices and inventory control reports, etc. can be printed out.

It is further preferred that the identifying and plausibility check information received or, at least a selection of it, is recorded. The EDP system, thus, not only makes calculations based on this information, it additionally records the location (destination) of the goods in the warehouse, maintains an inventory of the contents of the warehouse, and records plausibility data, especially contents verification.

Thus, this present invention provides a method for verifying the contents of packages containing goods for correctness of contents as they are delivered to or leave the warehouse that is perceptibly more effective in detecting errors including errors in quantity and quality of the goods whether innocent or deceptive in origin. This is accomplished by measuring at least one property of the articles contained in the respective packages in addition to the weight and volume of the package and is based on the principle that all identical packages should have the same measured values for these properties. For example, it is possible that a package delivered with deceptive intent matches the designated contents data with respect to volume and weight, but contains fewer articles or lower-quality articles instead of the designated goods.

The present invention thus detects whether shorting and employing fillers has occurred, for example, where a package containing a plurality of mens' shirts may have a package volume and weight which correspond exactly to the correct package volume and weight, yet contain only half the number of shirts indicated on the contents label because the missing half has been replaced by worthless fillers, such as cardboard, styrofoam or the like, to bring the volume and weight up to the designated values for the package. The present invention contemplates determining whether shorting has taken place at a station where the packages are subjected to any one or a combination of electrical, mechanical, and chemical techniques. For example, radiation application and sensing using known radiation sensing techniques and devices may be employed. This includes application of electromagnetic radiation, such as X-rays, which penetrates the packages and is detected or sensed after passing through the packages and their contents. If the package containing the goods is transparent, irradiation with visible light and sensing can be employed. Alternatively, application of acoustical energy, such as ultrasonic waves, may be employed together with sensing of, for example, reflected acoustical waves, using known acoustical sensing techniques. Thus, either radiation or acoustical energy application and sensing may be used to determine whether all shirts are actually present or whether a portion of the shirts has been replaced by worthless filler material. Other known techniques including computer tomography, nuclear spin measurement, seismographic or similar methods may also be employed.

Suitable sensing devices know in the art are employed in combination with application of radiation or acoustical energy to generate a signal indicative of quantity of shirts which is outputted to the EDP system (for example, a central computer) where the signal is inputted and is processed and preferably recorded. A plurality of computers may alternatively be employed and are then preferably in communication with one another. Such determinations as a matter of business procedure are useful for proving fraud, theft and/or deception for insurance purposes.

In the above example, the package contained identical articles, i.e., shirts. This is, however, not absolutely necessary. For example, a package could contain a plurality of different articles, such as shirts, blouses and/or undershirts, etc., and it would still be possible to determine if worthless filler was included so that shorting of the number of articles designated to be in the package had taken place.

The present invention additionally detects whether lower quality or lower cost components have been substituted for quality or costlier components. For example, a package containing a video recorder may have been supplier manipulated to include lower quality components. For example, components made of plastic may be substituted for metallic components, such as iron, which would be expected to produce a measurable influence when a magnetic field is applied. The present invention thus additionally contemplates determining whether substitution has taken place at a station where the packages are subjected to any one or a combination of electrical, mechanical, and chemical techniques. For example, applying a magnetic field to a package containing metallic components and measuring the change in the magnetic field can be used to determine whether components made of, for example, iron, have been substituted by plastic components which do not produce a change in the applied magnetic field. Suitable magnetic field measurement devices known in the art are employed to measure the magnetic field and generate a signal indicative of a property of the goods, for example, the presence of iron at a particular (designated or expected) signal level, which is outputted to EDP system where the signal is inputted and is processed and preferably recorded. A lower than expected signal for the presence of iron therefor indicates that a substitution may have occurred. Such determinations as a matter of business procedure are useful for proving fraud and/or deception for insurance purposes. A determination that a substitution has been made is—of course—not always impermissible but permissibility can be determined by contacting a materials testing facility and/or the manufacture/supporter, and is useful to minimize returned goods.

Alternatively, scrap metal, such as iron, could be added as a worthless filler material to increase the weight of a package. This deception could be discovered through application and measurement of the magnetic field, whereas a package weight measurement would not disclose the deception.

As another example, articles received by the warehouse could be identified as having a specific moisture content. Where worthless materials that contain little or no moisture have been substitute for some of the designated goods, the present invention would determine this deception through measurement of the moisture content. Suitable moisture content measuring devices are well known in the art. The signal generated by the moisture content measuring device is outputted to the EDP system where it is inputted, processed, such as by comparing the signal to standard signals for various moisture contents and/or the specific signal expected for the particular goods, and preferably recorded.

Additional techniques that could be useful include chemical analytical methods for identifying materials, some of which lend themselves to the method of the present invention. For example, radioactive degradation (carbon dating) may be useful to determine the age of articles.

While the foregoing examples have been given, they have been given by way of illustration and not limitation. Since the variety of goods is virtually infinite, and since the property of the goods to be measured, the specific measurement technique, and the specific signal generating sensor or detector can be selected from a wide variety of known techniques, selection of a particular property, technique, and sensor or detector must be tailored to the specific nature of the goods to be tested. A person skilled in the art could readily determine which property, technique, and sensor or detector would be appropriate for detecting these types of deception or errors for particular types of goods.

BRIEF DESCRIPTION OF THE DRAWINGS

The invention is described below by way of embodiments from which further crucial features ensue.

DETAILED DESCRIPTION OF THE PREFERRED EMBODIMENTS

Figure 1:
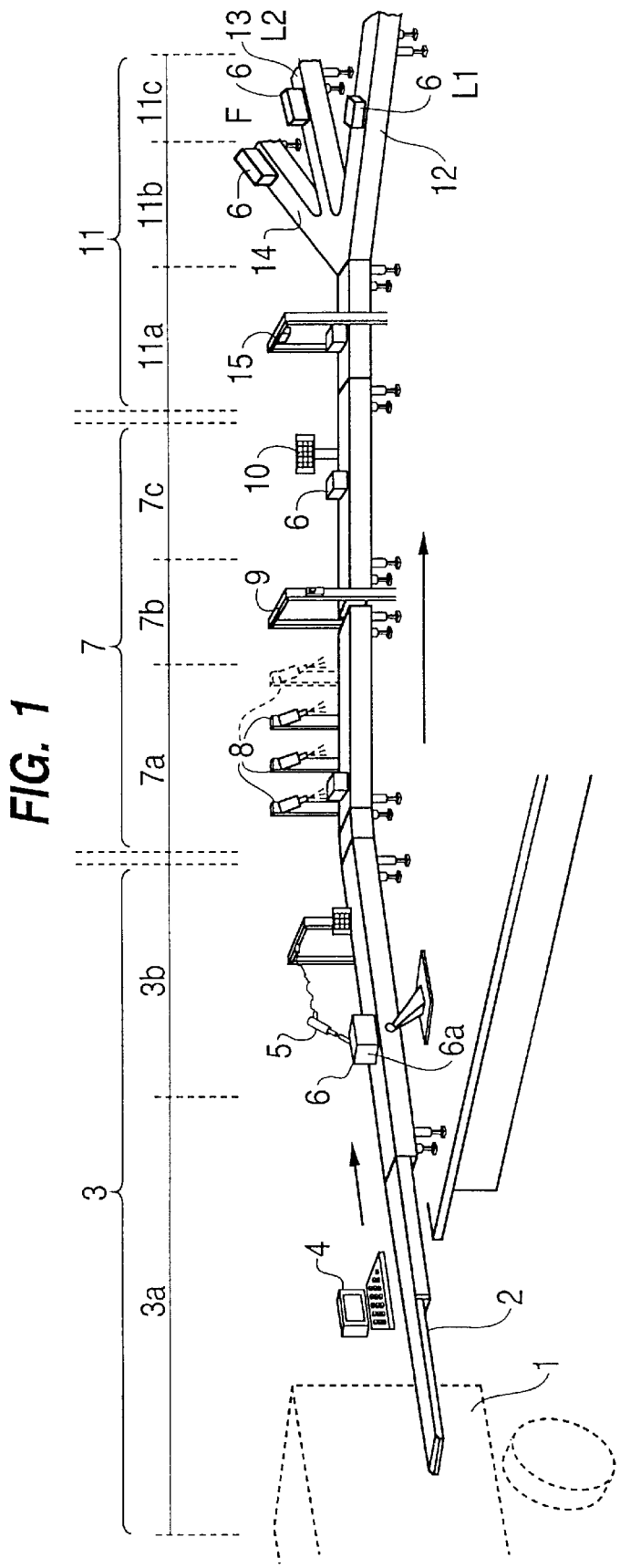
FIG. 1 schematically shows an apparatus for execution of the method according to the invention when goods arrive at a warehouse, FIG. 2 schematically shows an apparatus for execution of the method according to the invention when goods exit the warehouse and FIG. 3 schematically shows electronic control circuitry connecting the various stations included in the invention.

FIG. 1 schematically shows an apparatus for execution of the method according to the invention when goods arrive at a warehouse. A truck 1 is shown delivering packages 6 containing goods 6a to a conveyor belt 2 at an entrance to the warehouse which is at the front end of an arrival of goods line. The packages 6 are conveyed along a control path in the direction of the arrow to and through a region 3, which is an order/delivery region, for package identification from information available from the delivery papers of the truck 1 (region 3a) and for determination of desired parameter values for the contents available by reading labels on the packages themselves (region 3b). The identification and parameters (predetermined data values) are entered into an electronic data processing system (EDP system) which may be, for example, a central computer optionally interconnected with satellite computers or terminals), schematically shown by an input device 4. Entry may be manual using keyboard terminal 4, but is preferably automated and employs a scanner 5, such as label reader 5, which reads data on labels present on the incoming packages 6. Label reader 5 may be, for example, a camera of a scanner, in which case, preferably a total of six scanners are arranged that scan the packages on all sides, or some other type of identification device known per se in scanner technology. The desired values of the relevant predetermined data values for the delivery/destination are thus determined in region 3.

Packages 6 are conveyed from order/delivery region 3 to a region 7 where a plausibility check takes place. The plausibility check is at least three-fold and includes measurement of at least one property, preferably a physical property, of the goods 6a themselves (region 7a), measurement of volume of package 6 (region 7b), and measurement of weight of package 6 (region 7c). These measurements may take place in any order; however, it is preferable to first measure the volume and then the weight. These measurements generate actual data which is transmitted to the EDP system as described in more detail in the following.

The measurement of at least one property of the goods 6a themselves is schematically shown taking place in region 7a where a plurality of measuring devices 8 are positioned above packages 6 as it is conveyed through the region. Preferably the measurement is made during transit and, in any event, is automated. Devices 8 may be, for example, ultrasonic generators and sensors which non-destructively apply acoustical energy to the goods 6a within the packages and sense the acoustical response of the goods 6a, such as reflection of acoustical waves. A signal is thus generated which is indicative of a property of the goods 6a, such as a physical property, namely, acoustical response of the mass, and is outputted to the EDP system 4. The signal provides actual data which is inputted to the EDP system 4 where it is processed by comparing the desired data identified in region 3b (or available from previous property determinations by the warehouse for prior deliveries of like packages 6 which are stored in the EDP system as historical information) and inputted and stored in the EDP system 4 with the actual data provided by the signal indicative of the property. If the actual data is correct, the packages 6 are conveyed to a storage location. If the actual data is not correct, the packages 6 are conveyed to an error inspection location (region 11b). Preferably the desired and the actual data are stored in the EDP system.

The measurement of volume of the packages 6 is schematically shown taking place in region 7b where a volume measuring device 9 is positioned which measures the volume of the packages 6 as they are conveyed through region 7b. This involves measurement of basal surface area of the packages 6 and measurement of height of packages 6. To accomplish this, for example, the volume measuring device 9 may be a U-shaped measuring frame 9 which functions in the manner of a light curtain having appropriately stationed sensors as is known in the art. That is, packages 6 shade a corresponding height of the light curtain or barrier, and this yields the height of the package 6 which is generally a rectangular parallelepiped box. Length of the package 6 (a rectangular parallelepiped box) obtained from the known speed of conveyer 2 and the time of the shading of the light curtain, and width is measured from the shaded width of the light curtain. Electrical signals are generated by the sensors which correspond to the volume parameters and are indicative of volume. These are outputted to the EDP system.

The measurement of weight of the packages 6 is schematically shown taking place in region 7c where a weight measuring device 10 which includes a weight sensor, shown as scale 10, measures the weight of the packages 6 as they are conveyed through region 7c. An electrical signal is generated by the weight sensor which is indicative of the weight and which is outputted to the EDP system.

Packages 6 are conveyed from plausibility check region 7 to labelling/destination control region 11 where packages 6 are labelled (region 11a) and either conveyed via transport conveyor belt 12 or 13 to a storage location in the warehouse (region lib, see locations L1 and L2), for example, by palletizing and transportation to a shelving unit or to a storage area (not shown), if the actual data is correct compared to the desired data, or to an error inspection location via transport conveyor belt 14 (region 11c, see location F), if the actual data is not correct compared to the desired data. The packages then leave the control path at its exit.

If desired or necessary, an additional label can be applied to the packages 6 in region 11a. A labeling device 15 is schematically shown and obtains its information from the EDP system. This label carries the information mentioned above so that the destination of the package in the warehouse can be readily controlled. Additionally, a labelling device 15 can also be associated with region 7. One or more additional readers 5 (not shown) may also be provided in regions 11b and/or 11c which read labels applied by device 15 to verify the destination of the package and perform functions such as affixing postage or courier shipping information.

Figure 2:
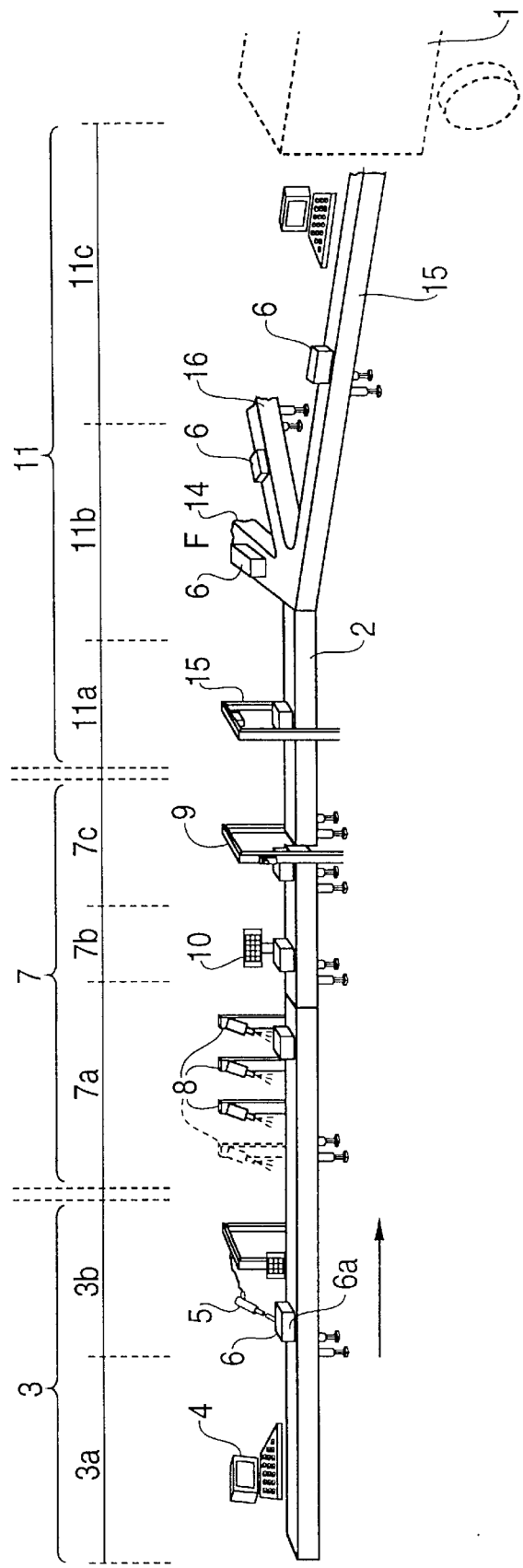
Figure 3:
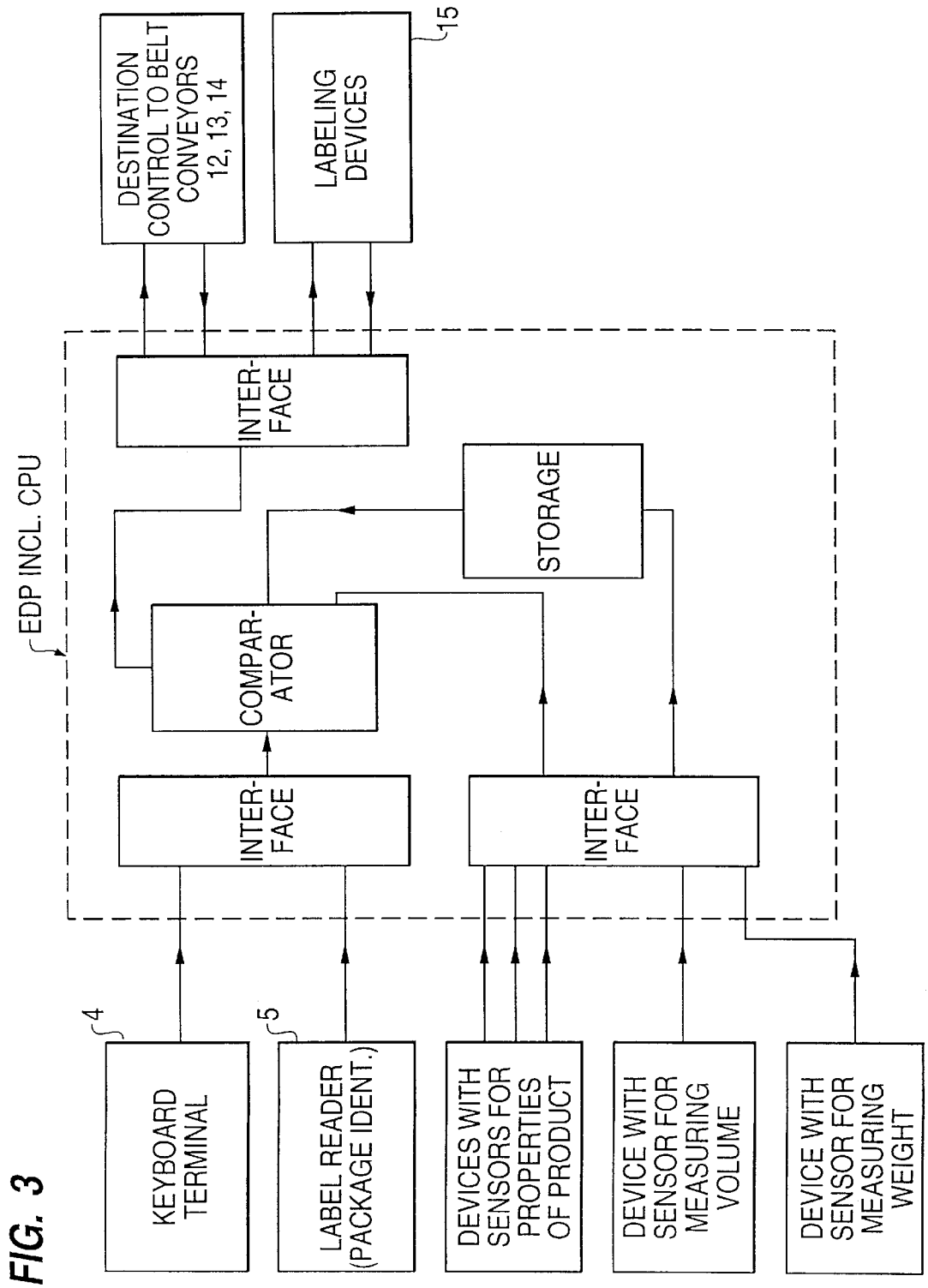

FIG. 2 schematically shows an apparatus for execution of the method according to the invention when goods exit the warehouse. An outgoing control line is illustrated which operates in a manner which is virtually identical to the arrival of goods line illustrated in FIG. 1. In FIG. 2, however, packages which have been retrieved from a storage location within the warehouse are processed, preferably automatically, beginning with order/delivery region 3, continuing through plausibility check region 7, and continuing through labelling/destination control region 11 from which the packages 6 are either sent via a conveyor belt 15 or 16 to a truck 1 which is outbound to customers, or to an error inspection location (region 11*b*). Thus, similar to the method shown in FIG. 1, if the actual data is correct, the packages 6 are conveyed to a truck 1. If the actual data is not correct, the packages 6 are conveyed to an error inspection location (region 11*b*) via conveyor belt 14. Since the method and apparatus employed in FIG. 2 is substantially similar to that of FIG. 1, a detailed description would be redundant and is not given herein for this reason.

The method and apparatus of the present invention thus advantageously provide plausibility checking and controlling the destination of incoming and outgoing packages containing goods in a warehouse which is preferably performed automatically, that is, to a large extent without human help. The method and apparatus additionally advantageously provide verification of the contents of packages delivered to or leaving a warehouse that is perceptibly more effective in detecting errors including errors in quantity and quality of the goods whether innocent or deceptive in origin.

Incoming packages may be automatically recorded without requiring any human involvement and, at the end of the control path, the packages may be automatically checked, for example, as to quantity and quality. The detailed descriptions of the incoming packages are expeditiously analyzed and warehouse destinations are expeditiously determined. The detailed descriptions of the outgoing packages are expeditiously analyzed and destinations are expeditiously determined for transport, and may include a completion report and an inventory entry.

Since the invention provides the option of performing all processes automatically and during transit, this results in a great number of items being processed per unit of time including automatic entry of incoming and outgoing data regarding the packages.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A method for verifying contents of a package containing goods delivered to or leaving a warehouse, comprising:

(a) conveying the package through consecutive stations;

(b) performing a plausibility check on the package in at least three respective stations by generating and outputting respective electrical signals which are indicative of respective plausibility parameters, and inputting the electrical signals to an electronic data processing means for effecting a plausibility determination, the plausibility check being comprised of:

(i) weighing the package in one of the at least three stations employing means for weighing and outputting an electrical signal indicative of weight;

(ii) measuring volume of the package in one of the at least three stations employing means for measuring volume and outputting an electrical signal indicative of volume; and (iii) measuring at least one property of the goods contained in the package in one of the at least three stations employing means for measuring the at least one property and outputting an electrical signal indicative of the at least one property;

(c) inputting electrical signals outputted from step (b) to the electronic data processing means;

(d) comparing the respective signals inputted to the electronic data processing means with respective predetermined data stored in the electronic data processing means and generating a plausibility determination including a contents verification determination as respective output signals as a function of the comparisons for effecting destination control of the package and for effecting verification of the contents of the package delivered to or leaving the warehouse; and (e) conveying a package whose contents are verified as correct to one of a storage location in the warehouse or to an exit of the warehouse for delivery to a customer, and conveying a package whose contents are not verified as correct to an error inspection location in the warehouse.

2. The method as defined in claim 1, further comprising labelling the package in one of the stations with information corresponding to the electrical signals outputted from step (b) and the respective output signals from step (d) prior to step (e).

3. The method as defined in claim 1, wherein measuring at least one property of the goods contained in the package is performed by employing at least one technique selected from the group consisting of electrical, mechanical, and chemical techniques.

4. The method as defined in claim 3, wherein measuring at least one property of the goods contained in the package is performed by employing a technique selected from the group consisting of radiation application and sensing, acoustical energy application and sensing, magnetic field application and measurement, and moisture content measurement.

5. The method as defined in claim 1, wherein the at least one property of the goods which is measured is a physical property.

6. The method as defined in claim 1, wherein the method is fully automated and wherein steps (b) through (e) take place in transit and during conveyance of the package.

7. A method for automated handling of a package containing goods in a warehouse and for verifying contents of the package delivered to or leaving the warehouse, comprising:

(a) conveying the package through consecutive stations;

(b) identifying the package in transit in one of the stations during conveyance of the package employing means for reading information present on the package and outputting an electrical signal indicative of the information to an electronic data processing means;

(c) performing a plausibility check on the package in transit in at least three respective stations during conveyance of the package by generating and outputting respective electrical signals which are indicative of respective plausibility parameters, and inputting the electrical signals to the electronic data processing means for effecting a plausibility determination, the plausibility check being comprised of:

(i) weighing the package in transit in one of the at least three stations during conveyance of the package employing means for weighing and outputting an electrical signal indicative of weight;

(ii) measuring volume of the package in transit in one of the at least three stations during conveyance of the package employing means for measuring volume and outputting an electrical signal indicative of volume; and (iii) measuring at least one property of the goods contained in the package in transit in one of the at least three stations during conveyance of the package employing means for measuring the at least one property and outputting an electrical signal indicative of the at least one property;

(d) inputting electrical signals outputted from steps (b) and (c) to the electronic data processing means;

(e) comparing the respective signals inputted to the electronic data processing means with respective predetermined data stored in the electronic data processing means including the electrical signal indicative of the identifying information and generating a plausibility determination including a contents verification determination as respective output signals as a function of the comparisons for effecting destination control of the package and for effecting verification of the contents of the package delivered to or leaving the warehouse; and (f) conveying a package whose contents are verified as correct to one of a storage location in the warehouse or to an exit of the warehouse for delivery to a customer, and conveying a package whose contents are not verified as correct to an error inspection location in the warehouse.

8. The method as defined in claim 7, further comprising labelling the package in transit in one of the stations during conveyance of the package with information corresponding to the electrical signals outputted from step (c) and the respective output signals from step (e) prior to step (f).

9. The method as defined in claim 7, wherein measuring at least one property of the goods contained in the package is performed by employing at least one technique selected from the group consisting of electrical, mechanical, and chemical techniques.

10. The method as defined in claim 9, wherein measuring at least one property of the goods contained in the package is performed by employing a technique selected from the group consisting of radiation application and sensing, acoustical energy application and sensing, magnetic field application and measurement, moisture content measurement.

11. The method as defined in claim 7, wherein the at least one property of the goods which is measured is a physical property.

12. An apparatus for verifying contents of a package containing goods delivered to or leaving a warehouse, comprising:

(a) means for conveying the package through consecutive stations;

(b) an electronic data processing means;

(c) means for performing a plausibility check on the package in at least three respective stations by generating and outputting respective electrical signals which are indicative of respective plausibility parameters, and inputting the respective electrical signals to the electronic data processing means for effecting a plausibility determination, the means for performing a plausibility check being comprised of:

(i) means for weighing the package in one of the at least three stations and outputting an electrical signal indicative of weight;

(ii) means for measuring volume of the package in one of the at least three stations and outputting an electrical signal indicative of volume; and (iii) means for measuring at least one property of the goods contained in the package in one of the at least three stations and outputting an electrical signal indicative of the at least one property; and (d) means for inputting electrical signals outputted from step (c) to the electronic data processing means;

(e) means for comparing the respective signals inputted to the electronic data processing means with respective predetermined data stored in the electronic data processing means and means for generating a plausibility determination including a contents verification determination as respective output signals as a function of the comparisons for effecting verification of the contents of the package delivered to or leaving the warehouse; and (f) means for conveying a package whose contents are verified as correct to one of a storage location in the warehouse or to an exit of the warehouse for delivery to a customer, and means for conveying a package whose contents are not verified as correct to an error inspection location in the warehouse.

13. An apparatus for automated handling of a package containing goods in a warehouse and for verifying contents of the package delivered to or leaving the warehouse, comprising:

(a) means for conveying the package through consecutive stations;

(b) an electronic data processing means;

(c) means for reading information present on the package in transit in one of the stations during conveyance of the package and outputting an electrical signal indicative of the information to the electronic data processing means;

(d) means for performing a plausibility check on the package in transit in at least three respective stations during conveyance of the package by generating and outputting respective electrical signals which are indicative of respective plausibility parameters, and inputting the respective electrical signals to the electronic data processing means for effecting a plausibility determination, the means for performing a plausibility check being comprised of:

(i) means for weighing the package in transit in one of the at least three stations during conveyance of the package and outputting an electrical signal indicative of weight;

(ii) means for measuring volume of the package in transit in one of the at least three stations during conveyance of the package and outputting an electrical signal indicative of volume; and (iii) means for measuring at least one property of the goods contained in the package in transit in one of the at least three stations during conveyance of the package and outputting an electrical signal indicative of the at least one property; and (e) means for inputting electrical signals outputted from steps (c) and (d) to the electronic data processing means;

(e) means for comparing the respective signals inputted to the electronic data processing means with respective predetermined data stored in the electronic data processing means including the electrical signal indicative of the identifying information and means for generating a plausibility determination including a contents verification determination as respective output signals as a function of the comparisons for effecting destination control of the package and for effecting verification of the contents of the package delivered to or leaving the warehouse; and (f) means for conveying a package whose contents are verified as correct to one of a storage location in the warehouse or to an exit of the warehouse for delivery to a customer, and means for conveying a package whose contents are not verified as correct to an error inspection location in the warehouse.

\* \* \* \* \*